United States Patent [19]

Bayly

[11] Patent Number: 5,034,605

[45] Date of Patent: Jul. 23, 1991

[54] SECONDARY ION MASS SPECTROMETER WITH INDEPENDENTLY VARIABLE EXTRACTION FIELD

[75] Inventor: Alan R. Bayly, Haywards Heath, England

[73] Assignee: VG Instruments Group Limited, Crawley, England

[21] Appl. No.: 438,532

[22] Filed: Nov. 17, 1989

Related U.S. Application Data

[63] Continuation of Ser. No. 154,632, Feb. 10, 1988, abandoned.

[30] Foreign Application Priority Data

Feb. 10, 1987 [GB] United Kingdom ................ 8703012

[51] Int. Cl.[5] ............................................ G01N 23/00

[52] U.S. Cl. .................................... 250/309; 250/307

[58] Field of Search ............... 250/306, 307, 309, 281, 250/282, 288, 396 R, 358, 305

[56] References Cited

U.S. PATENT DOCUMENTS

| | | | |
|---|---|---|---|
| 4,556,794 | 12/1985 | Ward et al. | 250/309 |
| 4,652,753 | 3/1987 | Shiokawa | 250/305 |
| 4,748,325 | 5/1988 | Slodzian | 250/309 |
| 4,785,172 | 11/1988 | Kubena et al. | 250/309 |
| 4,803,355 | 2/1989 | Takahashi | 250/309 |
| 4,818,872 | 4/1989 | Parker et al. | 250/309 |

FOREIGN PATENT DOCUMENTS

| | | | |
|---|---|---|---|
| 2826604 | 1/1980 | Fed. Rep. of Germany | 250/305 |
| 1185203 | 3/1970 | United Kingdom . | |
| 1268813 | 4/1972 | United Kingdom . | |

OTHER PUBLICATIONS

Werner H. and Morgan A. E., Journal of Applied Physics, 1976, vol. 47, No. 4, pp. 1232 to 1242.
Grivet P., Electron Optics 1972 Pergamon Press, Oxford Liebl H. Optik 1979, vol. 53, No. 1, pp. 69 to 72.
Wittmaack K., Journal of Applied Physics, 1979, vol. 50, No. 1, pp. 493 to 497.
Werner H. W. and Warmoltz N., Journal of Vacuum Science & Technology A 1984, vol. 2, No. 2, pp. 726 to 731.
Slodzian G. et al., Microbeam Analysis, San Fransisco Press 1986, p. 78.
Slodzian G., Advances in Electronics and Electron Physics, 1980, Supplement 13B, pp. 1–44.
Liebl H., Scanning 1980, vol. 3, pp. 79 to 89.
Bedrich W. et al., Springer Series in Chemical Physics, SIMS III 1981, vol. 19, pp. 81 to 87.

*Primary Examiner*—Bruce C. Anderson
*Attorney, Agent, or Firm*—Clinton, Alix & Van Kirk

[57] ABSTRACT

A method and apparatus for the micro-analysis of a sample surface wherein a mass analyzer is used to analyze secondary ions emitted from the surface in response to the impact of primary radiation. The method comprises: extraction the secondary ions in an electric extraction field maintained by applying an extraction potential difference between the sample and an extraction means, and also maintaining an accelerating potential difference between the sample and the mass analyzer thereby increasing the kinetic energy of the secondary ions to be substantially equal to the energy required for analysis in the mass analyzer; the extraction potential difference being less than the accelerating potential difference. In this way the extraction field can be controlled independently of the accelerating potential between the sample and the mass analyzer.

22 Claims, 1 Drawing Sheet

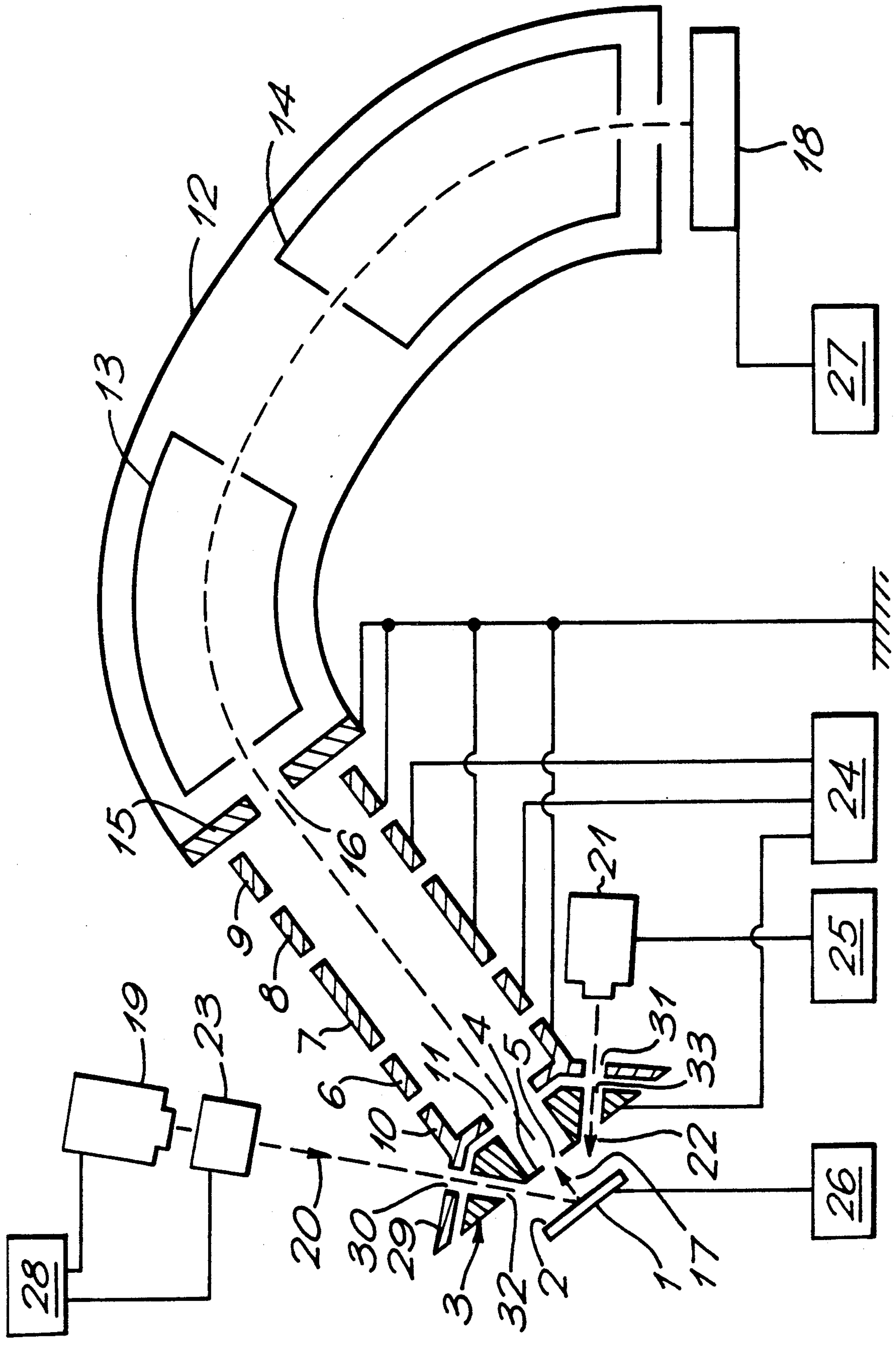
12
13
14
15
16
18
27
24
21
25
26
28
19
23
20
9
8
7
6
10
11
4
5
31
33
22
17
1
2
32
3
29
30

SECONDARY ION MASS SPECTROMETER WITH INDEPENDENTLY VARIABLE EXTRACTION FIELD

This is a continuation of co-pending application Ser. No. 154,632 filed on Feb. 10, 1988, now abandoned.

BACKGROUND OF THE INVENTION

1. Field of the Invention

This invention relates to a method and apparatus for the micro-analysis of the surface of a sample, and particularly to secondary ion mass spectrometry.

2. Description of the Prior Art

In secondary ion mass spectrometry (SIMS), a sample is bombarded by primary ions causing the emission of secondary ions characteristic of the composition of the surface layers of the sample. More generally, secondary ions may be caused to be released from a surface by other forms of primary radiation which may comprise laser radiation, electrons or neutral atoms. After release, the secondary ions are collected and then analysed by the techniques of mass spectrometry. For example, a SIMS instrument may comprise a double focusing mass spectrometer having an electrostatic energy-focusing analyser and a magnetic sector mass analyser. Alternatively a SIMS instrument may comprise a time-of-flight analyser. Two-dimensional images of the surface of a sample may be obtained by direct imaging of an area on a surface, or by scanning a finely focused probe across a surface. Techniques and apparatus for SIMS have been reviewed by G. Slodzian in Advances in Electronics and Electron Physics, supplement 13B, pages 1 to 44, 1980 and by H. Liebl in Scanning, volume 3, pages 79 to 89, 1980.

In general, the secondary ions are collected from the surface by an extraction field and they pass, in some instances via transfer optics, to the mass analyser. The secondary ions are thus accelerated in the extraction field so that they arrive at the mass analyser with a velocity suitable for the mass analyser to function. For example, a magnetic sector mass spectrometer would require the ions to be accelerated through several kV. It is usually convenient to maintain the entrance to the mass analyser substantially at earth potential and to maintain the sample at an electric potential of a polarity to repel the ions of interest and of a strength which will accelerate the secondary ions to the velocity required for analysis in the mass analyser.

In conventional instruments, as illustrated by H. Liebl (op cit), an earthed extraction electrode is positioned close to the surface of the sample to establish an extraction field. There is an advantage, particularly for direct imaging instruments, in having a high extraction field strength because, as discussed for example by G. Slodzian (op cit), the minimum distance that can be resolved between two points on a surface is inversely proportional to the extraction field strength. An alternative arrangement, intended to increase the extraction field near to the surface and so improve spatial resolution, has been described by H. Liebl in Optik, volume 53, number 1, 1979, pages 69 to 72. In that apparatus the extraction field is increased by applying an attractive potential to the extraction electrode. So, to extract positive ions for example, the surface is maintained at approximately +5 kV and the extraction electrode is maintained at approximately −15 kV: the ions are thereby accelerated in a high field away from the surface and are subsequently decelerated in travelling to an earthed electrode. The geometry of H. Liebl's design is similar to that of the Brüche-Johansson lens, commonly used in electron microscopes, and described by P. Grivet in Electron Optics, Pergamon Press, Oxford, 1972. In electron microscopes the potential of the electrode nearest to the surface, known as the Wehnelt of the Brüche-Johansson lens, is adjusted to facilitate fine focusing of the image.

It is also known, as in the non-imaging mass spectrometer described in United Kingdom Patent No. 1,185,203, to provide an extra electrode disposed between the sample and accelerating electrodes. In that instrument the extra electrode is biased to establish potential barrier through which the secondary ions must pass before entering the mass spectrometer. The purpose of the extra electrode is to reduce the flux of ions originating in the residual gas which would otherwise interfere with the spectrum of the ions from the surface.

When SIMS is used to study a sample of electrically insulating material, electrical charge may accumulate on the surface near to the site of incidence of the primary ion beam. The accumulated charge may repel the incident beam, and reduce or even eliminate the secondary ion emission. The mechanism of the charging process depends upon the polarity of the incident ions, the direction of the extraction field, and the nature of the sample. Contributions to the balance of charge at the surface come from the primary ion beam, secondary ions and secondary electrons, though in general the secondary ion yield is low and is therefore not a major contribution to the charge balance. The processes of surface charging have been discussed in detail by H. Werner and A. E. Morgan in the Journal of Applied Physics, volume 47, pages 1232 to 1242, 1976.

One known method of alleviating the accumulation of surface charge is to deposit a conductive grid onto the surface, though this may introduce contaminants from the material of the grid into the spectra. Werner and Morgan have described how a diaphragm in contact with the surface and having an aperture larger than the extraction area of secondary ions can also reduce surface charge. Moreover, specifically to alleviate negative charge which accumulates during bombardment by negative primary ions, such a diaphragm may be placed close to but not in contact with the surface and biased slightly positive with respect to the surface; the charge is then reduced because secondary electrons are attracted to the diaphragm. However, like a grid, a diaphragm may inhibit the detection of secondary ions from the sample if the primary ions strike the conductive material and if that material has a significant sputter yield: Werner and Morgan acknowledge that the diaphragm does restrict lateral imaging of the sample.

In SIMS, if positive primary ions are used to analyse insulating samples a positive charge will tend to accumulate on the surface. A technique commonly employed to alleviate this is to apply a primary electron 'flood' beam to the surface concurrently with the primary ion current. For this to neutralise the surface charge there must be a balance between the significant currents, which generally are: the primary ion, primary electron and secondary electron currents. Clearly, if the primary electron flood current is too great, the surface can become negatively charged near to the site of beam impact. When t he sample is biased negative with respect to the earthed extraction electrode, in order to extract negative secondary ions, an electron flood beam initially of high energy, will be retarded and will reach the surface with low energy. G. Slodzian et al, in Microbeam Analysis 1986, published by the San Francisco Press Inc, page 78, has described apparatus in which a high-energy electron beam is directed perpendicularly towards a surface. Electrons in the incoming beam are slowed down as they approach the surface, and subsequently neutralise the positive surface charge. Alternatively, when the sample is biased positive in order to extract positive secondary ions, a primary electron flood beam can be directed and accelerated towards the surface. However, if the flood current is too large the surface may charge negatively and inhibit the release of positive secondary ions. Excessive negative charging may be alleviated by the release of secondary electrons, though when the sample is at a positive potential these will be attracted back to the surface by the extraction field. The balance between currents in this case has been discussed by Werner and Morgan who concluded that secondary electron emission could effectively reduce the local negative charging due to excessive flood current only if the sample were to charge up to the extraction electrode potential, but this Would drastically reduce the secondary ion current.

In apparatus for SIMS employing negatively charged primary ions an insulating sample may charge negatively, with consequent degradation of performance, and even with a neutral primary beam there may be some charging of the surface resulting from the loss of secondary particles, notably secondary electrons.

Further problems in SIMS arise in the study of samples with irregular surfaces. Surface roughness causes variation in the angles at which secondary particles leave the surface and corresponding variation in the intensity of the detected secondary signal. Bedrich et al, in the Springer Series In Chemical Physics, volume 19, SIMS III, pages 81 to 87 show the variation in intensity of a two-dimensional surface image caused by a roughness of up to 5 μm.

In summary, while SIMS is an established and important technique of surface analysis there are, nevertheless, aspects which could usefully be improved, particularly in the analysis of insulating samples, or samples with irregular surfaces.

SUMMARY OF THE INVENTION

It is an object of this invention therefore, to provide an improved method for the micro-analysis of the surface of a sample.

It is a further object of this invention to provide an improved apparatus adapted for the micro-analysis of the surface of a sample.

According to one aspect of the invention there is provided a method for the micro-analysis of a surface of a sample in which a mass analyser is used to analyse secondary ions emitted from said surface in response to the impact of primary radiation on said surface, said method comprising:

(a) extracting said secondary ions from said surface in an electric extraction field maintained by applying an extraction potential difference between said sample and an extraction means; and (b) maintaining an accelerating potential difference between said sample and said mass analyser thereby increasing the kinetic energy of said secondary ions to be substantially equal to the energy required for analysis in said mass analyser;

in which said extraction potential difference is less than said accelerating potential difference.

By this method the extraction field, can be set or varied independently of the accelerating potential difference between the sample and the mass analyser.

In a preferred embodiment of said method the primary radiation comprises positive primary ions and said method also comprises flooding said surface with primary electrons.

According to another aspect of the invention there is provided an apparatus adapted for the micro-analysis of the surface of a sample, comprising:

(a) means for maintaining said sample at a positive first electric potential;

(b) means for irradiating said surface with a flux of primary radiation, causing the emission of secondary radiation comprising positively charged secondary ions from said surface;

(c) a mass analyser, having an entrance, and means to maintain said entrance at a second electric potential which is less positive than said first electric potential by an amount substantially equal to the accelerating potential which will accelerate said positively charged secondary ions to the velocity required by said mass analyser; and (d) an extraction means disposed between said surface and said entrance of said mass analyser, and means to maintain said extraction means at a third electric potential which is more positive than said second electric potential and is less positive than said first electric potential.

In said apparatus, described above, positively charged secondary ions are extracted from the sample and subsequently accelerated towards the mass analyser.

According to another aspect of the invention there is provided an apparatus adapted for the micro-analysis of the surface of a sample, comprising:

(a) means for maintaining said sample at a negative, first electric potential;

(b) means for irradiating said surface with a flux of primary radiation, causing the emission of secondary radiation comprising negatively charged secondary ions from said surface;

(c) a mass analyser, having an entrance, and means to maintain said entrance at a second electric potential which is less negative than said first electric potential by an amount substantially equal to the accelerating potential which will accelerate said negatively charged secondary ions to the velocity required by said mass analyser; and (d) an extraction means disposed between said surface and said entrance of said mass analyser, and means to maintain said extraction means at a third electric potential which is more negative than said second electric potential and is less negative than said first electric potential.

Hence, the invention provides apparatus which, in one aspect is adapted to extract and subsequently mass analyse positively charged secondary ions from the surface of a sample, while in another aspect is adapted to extract and subsequently mass analyse negatively charged secondary ions from the surface of a sample. The terms "less positive" and "more positive" are intended to include not only potentials which are positive with respect to earth, but also negative potentials satisfying the relations as defined. Likewise, "less negative"

and "more negative" include positive as well as negative potentials with respect to earth.

Preferably, the potential of the entrance to said mass analyser is set substantially equal to earth potential, conventionally the zero of potential.

The invention allows the potential of the extraction means, and hence the extraction field which exists between the sample and the extraction means, to be set or varied independently of the accelerating potential difference between the sample and the mass analyser. As stated, the potential difference between the sample and the entrance to the mass analyser is maintained to be substantially equal to the accelerating potential difference required by the mass analyser (to accelerate the secondary ions to a velocity Suitable for analysis). Preferably the mass analyser comprises a double-focusing mass spectrometer, comprising an energy-focusing electric sector and a magnetic sector; such analysers typically require the ions to be accelerated through a potential difference in the range of 2 kV to 10 kV. In prior SIMS instruments the extraction field is determined by this accelerating potential difference, whereas the extraction field in this invention is independent of the accelerating potential and is reduced from that of prior SIMS instruments. We have found that the reduced extraction field is particularly effective in improving performance, in terms of increased signal strength and signal uniformity in the study of insulating samples and also for samples with irregular surfaces. This is surprising because prior work has been directed towards increasing the extraction field near to the sample. The reasons for the improved performance are not fully understood, though in the case of insulating samples it may be that the reduced field in some instances allows charge to leave the surface in the form of secondary particles which would otherwise be trapped on the surface, while for irregular surfaces the improved performance may be a consequence of the effect of the reduced extraction field on the initial local acceleration of the secondary ions away from the surface irregularities; no general mechanism has yet been established.

The invention is not restricted to apparatus comprising a double-focusing mass spectrometer, but may alternatively comprise any type of mass analyser in which an extraction field is applied to the sample and an accelerating field is also employed; in one alternative embodiment the invention comprises an energy-focusing time-of-flight analyser.

In a preferred embodiment of the invention the primary radiation comprises positive primary ions, alternatively the primary radiation may comprise negative primary ions, or neutral atoms or laser radiation. In a preferred embodiment of the invention the means for irradiating the surface of the sample with a flux of primary radiation comprises a primary ion gun. Also in a preferred embodiment means are provided to, scan the primary radiation across the surface of the sample, and to detect secondary ions, synchronously for example, thereby generating a two-dimensional image of the sample's surface. It is also preferred that the apparatus comprises means for irradiating the surface with a flux of primary electrons, the purpose of which is to neutralise any positive charge which may accumulate on the surface, particularly during bombardment by positive primary ions. The means for irradiating the surface with a flux of primary electrons may conveniently comprise an electron flood gun.

In a preferred embodiment of the invention the extraction means comprises an extraction electrode having an extraction aperture. Also in a preferred embodiment there is provided transfer optics disposed between the extraction means and the mass analyser. The transfer optics comprises an entrance electrode which has an entrance aperture and is maintained at an electric potential which may be adjustable, or may be set substantially at earth potential; in a preferred embodiment the entrance electrode of the transfer optics is maintained at substantially the same electric potential as the entrance to the mass analyser.

Hence, in a preferred embodiment of the invention the secondary ions are extracted from the surface of the sample in an extraction field, are directed towards the extraction electrode, pass through the extraction aperture and are then accelerated towards the entrance of the transfer optics. Preferably the potential of the entrance to the transfer optics and the potential of the entrance to the mass analyser are both substantially equal to earth potential, and the potential of t he sample is numerically equal to the accelerating potential difference required by the mass analyser.

Preferably the potential of the extraction means, which is said third electric potential, is selected and maintained at a value which substantially maximises the transmission of the spectrometer, thereby giving substantially maximum signal strength and quality of the spectra and images obtained. We have found that, with optimum tuning of the transfer optics the invention is particularly effective when the potential difference between the sample and the extraction means is a certain percentage of the potential difference between the sample and the entrance to the mass analyser; moreover the invention is particularly effective when the potential difference between the sample and the extraction means is in a range from 5% to 50%, typically 25%, of the potential difference between the sample and the entrance to the mass analyser. That is representing the first, second and third potentials by $V_1$, $V_2$ and $V_3$ respectively, the invention is particularly effective when $(V_1-V_3)/(V_1-V_2)$ is in a range from 0.05 to 0.50. Also we have found an extraction field in a range of from substantially 0.20 $Vmm^{-1}$ to 1 $kVmm^{-1}$ to be effective. In a preferred embodiment of the invention the sample is disposed with its surface at a distance of subtantially 5 mm from the extraction electrode.

To allow access for the primary ion beam to be incident upon the surface of the sample a first access aperture may be formed in the extraction means through which primary ions pass from the primary ion gun to the surface. There may also be a second access aperture formed in the extraction means to allow primary electrons to pass from the electron flood gun to the surface. In a preferred embodiment of the invention the entrance to the transfer optics comprises an extension member in which are provided also a third access aperture to allow the passage of primary ions and a fourth access aperture to allow the passage of primary electrons. Hence in a preferred embodiment primary ions pass from the primary ion gun, through the third access aperture and then the first access aperture to the surface, also primary electrons (if required) pass from the electron flood gun, through the fourth access aperture and then the second access aperture to the surface.

BRIEF DESCRIPTION OF THE DRAWING

The present invention may be better understood and its numerous advantages and objects will become apparent to those skilled in the art by reference to the accompanying drawing which is a schematic showing of apparatus in accordance with the preferred embodiment of the invention.

DESCRIPTION OF THE DISCLOSED EMBODIMENT

A preferred embodiment of the invention will now be described, by way of example, and with reference to the figure which shows in schematic form a secondary ion mass spectrometer, comprising:

(i) sample 1, having surface 2;
(ii) extraction means 3, comprising extraction electrode 4 with extraction aperture 5;
(iii) transfer optics comprising electrodes 6, 7, 8 and 9, and entrance electrode 10 having entrance aperture 11;
(iv) mass analyser 12, comprising magnetic sector 13 and electric sector 14, and having an entrance comprising entrance plate 15 and entrance aperture 16;
(v) secondary ion detector 18;
(vi) the primary ion source, comprising ion gun 19 and scanning means 23 which is the means to irradiate surface 2 with a flux of primary radiation, which in this preferred embodiment is the flux of primary ions 20; and
(vii) electron flood gun 21, which is the means to irradiate surface 2 with a flux of primary electrons 22.

A first access aperture 32 and a second access aperture 33 are formed in extraction means 3 as shown. Also shown in the figure is an extension member 29 of entrance electrode 10 in which are formed a third access aperture 30, and a fourth access aperture 31. Primary ions 20 pass from ion gun 19, via scanning means 23, through aperture 30, and then through aperture 32 to strike surface 2. The figure also shows the secondary ions 17 emitted from surface 2 in response to the impact of primary ions 20. It is within the scope of the invention for primary ions 20 to be either positively or negatively charged.

The apparatus first to be described is the aspect of the invention adapted for the analysis of secondary ions 17 having positive charge. In that apparatus sample 1 is maintained at a positive first electric potential $V_1$ by voltage supply 26. Entrance plate 15 of mass analyser 12, and entrance electrode 10 of the transfer optics, are maintained at a second electric potential $V_2$, which is conveniently earth potential, although alternatively the potential of electrode 10 may be independently controlled. The potential of extraction electrode 4, which in this case is a positive third electric potential $V_3$, is controlled by voltage supply 24, which also controls the potentials of electrodes 6 and 0 of the transfer optics.

The extraction potential difference $(V_1-V_3)$ gives rise to the extraction field between sample 1 and extraction means 3. Potential $V_1$ is substantially equal to the accelerating potential required by mass analyser 12 which is typically in the range from 2 kV to 10 kV. The ratio $(V_1-V_3)/(V_1-V_2)$ is in a range from 0.05 to 0.50 which, it is found, optimises the transmission of the spectrometer. The distance between sample 1 and extraction electrode 4 is typically 5 mm (the components of the figure are, for clarity, not drawn to scale); the extraction field is typically in a range from approximately 20 $Vmm^{-1}$ to 1 $kVmm^{-1}$. An accelerating electric field is established by a potential difference $(V_3-V_2)$ between the extraction means and the entrance electrode 10 of the transfer optics.

Primary ions 20 are supplied from ion gun 19 and bombard surface 2 of sample 1 with energy in the typical range from 1 kV to 30 kV. The current density of primary ions 20 may be in the range from 1 $nAcm^{-2}$ to 1 $Acm^{-2}$. Ion gun 19 is controlled by control unit and power supply 28. Electron flood gun 21 is provided for use in the study of insulating samples to supply primary electrons 22 to neutralise positive charge which may accumulate on surface 2, particularly when primary ions 20 are positively charged. Electron flood gun 21 is controlled by control unit and power supply 25. The current density of primary electrons 22 has to equal or exceed that of primary ions 20.

In response to the impact of primary ions 20 on surface 2, the secondary ions 17 are emitted and are attracted towards extraction means 3. Secondary ions 17 pass through extraction aperture 5, continue towards entrance aperture 11 of the transfer optics and then proceed towards entrance aperture 16 of mass analyser 12. In travelling from surface 2 to aperture 11, secondary ions 17 are accelerated through a total potential difference $(V_1-V_2)$ equal to the accelerating potential required by mass analyser 12; the kinetic energy of the ions at entrance aperture 16 of mass analyser 12 is substantially the same as at aperture 11. However, the extraction field strength is determined by the difference $(V_1-V_3)$ between sample 1 and the extraction means, as described. Secondary ions 17 are analysed in mass analyser 12 and subsequently pass to detector 18.

In the aspect of the invention adapted for the analysis of secondary ions 17 having negative charge, sample 1 is maintained at a negative first electric potential $V_1$, entrance plate 15 and entrance electrode 10 are maintained at a second potential $V_2$, which is preferably earth potential, and extraction electrode 4 is then maintained at a negative third potential $V_3$. Again to optimise the transmission of the spectrometer $(V_1-V_3)/(-V_1-V_2)$ is typically in a range of from 0.05 to 0.50. It will be understood how potentials $V_1$, $V_2$ and $V_3$ extract and accelerate negative ions in a manner similar to the case of positive ions.

Also shown in the figure are: scanning means 23, adapted to scan primary ions 20 across surface 2; and the detector signal analyser 27, which comprises means to detect secondary ions 17, for example synchronously, thereby allowing the recording of a two-dimensional image, as known in the art. It will be appreciated that items 1 to 23 and 29–33 are enclosed within a conventional vacuum chamber and that there are power supplies and control units for items 12 and 18 not shown in the figure.

What is claimed is:

1. In a method for the micro-analysis of a surface of a sample in which a mass analyser is used to analyse secondary ions emitted from said surface in response to the impingement of primary radiation on said surface, said method comprising the steps of:

positioning the sample adjacent to but spaced from an apertured extraction electrode;

applying an extraction potential to the extraction electrode to thereby provide an extraction potential difference between the sample and the extraction electrode, said extraction potential difference producing an electric extraction field for extracting said secondary ions from the vicinity of said surface without dependence upon ion energy and directing the extracted secondary ions along a substantially linear path through an aperture in the extracting electrode towards the mass analyser;

maintaining an accelerating potential difference between said sample and said mass analyser to thereby increase the kinetic energy of said extracted secondary ions whereby the energy of said extracted ions will be substantially equal to the energy required for analysis in the mass analyser; and selecting said extracting potential independently of the accelerating potential difference to thereby provide a said extraction potential difference which is less than and independent of said accelerating potential difference.

2. A method as claimed in claim 1, wherein said extraction field is in a range of from substantially 20 $Vmm^{-1}$ to 1 $kVmm^{-1}$.

3. A method as claimed in claim 1, wherein said primary radiation comprises positive primary ions, said method also comprising flooding said surface with primary electrons.

4. The method of claim 1 wherein said step of selecting comprises adjusting said extraction potential such that the extraction potential difference will be in a range of 5% to 50% of said accelerating potential difference.

5. The method of claim 4 wherein said step of selecting further comprises adjusting said extracting potential so as to maximize the transmission of the spectrometer.

6. The method of claim 1 wherein said step of selecting comprises adjusting said extraction potential so as to maximize the transmission of the spectrometer.

7. Apparatus for the micro-analysis of a surface of sample comprising:

(a) first power supply means for maintaining said sample at a positive first electric potential;

(b) means for irradiating said surface with a flux of primary radiation, said flux of primary radiation causing the emission of secondary radiation comprising positively charged secondary ions from said surface;

(c) a mass analyser, said analyser having means defining an ion entrance, said mass analyser further having means for maintaining said ion entrance at a second electric potential which is less positive than first electric potential by amount substantially equal to an accelerating potential which will accelerate said positively charged secondary ions to the velocity required by said mass analyser;

(d) extraction means disposed between said surface and said ion entrance of said mass analyser, said extraction means comprising a single apertured extraction electrode; and (e) second power supply means for maintaining said extraction means electrode at a third electric potential which is more positive than said electric potential, is less positive than said first electric potential and is independent of said first and second electric potentials.

8. An apparatus as claimed in claim 7, wherein said second electric potential is substantially equal to earth potential.

9. An apparatus as claimed in claim 7, and also comprising transfer optics disposed between said extraction means electrode and said entrance of said mass analyser.

10. An apparatus as claimed in claim 7, and wherein, representing said first electric potential by $V_1$, said second electric potential by $V_2$, and said third electric potential by $V_3$, a ratio $(V_1-V_3)/(V_1-V_2)$ is in a range of from 0.05 to 0.5.

11. An apparatus as claimed in claim 7 wherein said mass analyser comprises an electric sector and a magnetic sector.

12. An apparatus as claimed in claim 7, also comprising: a primary electron flood gun, for flooding said surface with primary electrons; and a primary ion gun; and in which said primary radiation comprises positive primary ions supplied from said primary ion gun.

13. An apparatus as claimed in claim 7, also comprising: means for scanning said primary radiation across said surface, means for detecting said secondary ions, and means for deriving a two-dimensional image of said surface.

14. Apparatus for the micro-analysis of a surface of a sample comprising:

(a) first power supply means for maintaining said sample at a negative, first electric potential;

(b) means for irradiating said surface with a flux of primary radiation, said flux of primary radiation causing the emission of secondary radiation comprising negatively charged secondary ions from said surface;

(c) a mass analyser, said analyser having means defining an ion entrance, said mass analyser further having means for maintaining said ion entrance at a second electric potential which is less negative than said first electric potential by an amount substantially equal to an accelerating potential which will accelerate said negatively charge secondary ions to the velocity required by said mass analyser;

(d) extraction means disposed between said surface and said ion entrance of said mass analyser, said extraction means comprising a single apertured extraction electrode; and (e) second power supply means for maintaining said extraction means electrode at a third electric potential which is more negative than said second electric potential, is less negative than said first electric potential.

15. An apparatus as claimed in claim 14, wherein said second electric potential is substantially equal to earth potential.

16. An apparatus as claimed in claim 14, and also comprising transfer optics disposed between said extraction means electrode and said entrance of said mass analyser.

17. An apparatus as claimed in claim 14, and wherein, representing said first electric potential by $V_1$, said second electric potential by $V_2$, and said third electric potential by $V_3$, a ratio $V_1-V_3)/V_1-V_2)$ is in a range of from 0.05 to 0.5.

18. An apparatus as claimed in claim 14, in which said mass analyser comprises an electric sector and a magnetic sector.

19. An apparatus as claimed in claim 14, and also comprising: a primary electron flood gun, for flooding said surface with primary electrons; and a primary ion gun; and in which said primary radiation comprises positive primary ions supplied from said primary ion gun.

20. An apparatus as claimed in claim 14, also comprising: means for scanning said primary radiation across said surface, means for detecting said secondary ions, and means for deriving a two-dimensional image of said surface.

21. Apparatus for the micro-analysis of a surface of a sample comprising:

means for irradiating said surface with a flux of primary radiation to cause the emission of secondary ions from said surface;

a mass analyzer, said analyzer having means defining an ion entrance aperture;

first power supply means for establishing a first potential difference between said analyzer ion entrance aperture defining means and the sample, said first power supply means applying a potential to said analyzer entrance aperture defining means which is less negative than the potential applied to the sample, said first potential difference comprising a secondary ion accelerating potential;

extraction means disposed between said mass analyzer ion entrance aperture defining means and the sample, said extraction means being located immediately downstream of said sample in the direction of secondary ion travel and comprising a single extraction electrode having an extraction aperture;

second power supply means for establishing a second potential difference between said extraction electrode and the sample to provide an extraction field for directing secondary ions toward said analyzer means, said second power supply means maintaining said extraction electrode at an electrical potential which is more negative than the potential at which said analyzer means ion entrance aperture defining means is maintained and at a potential which is less negative than the potential applied to the sample, said second potential difference establishing means being adjustable independently of said first potential difference establishing means; and means for delivering secondary ions exiting said extraction field via said extraction aperture to said analyzer means via said entrance aperture defining means.

22. Apparatus for the micro-analysis of a surface of a sample comprising:

means for irradiating said surface with a flux of primary radiation to cause the emission of negatively charged secondary ions from said surface;

a mass analyzer, said analyzer having means defining an ion entrance aperture;

first power supply means for establishing a first potential difference between said analyzer ion entrance aperture defining means and the sample, said first power supply means supplying a potential to said analyzer entrance aperture defining means which is less negative than the potential applied to the sample, said first potential difference comprising a secondary ion accelerating potential;

extraction means disposed between said mass analyzer ion entrance aperture defining means and the sample, said extraction means being located immediately downstream of said sample in the direction of secondary ion travel and comprising a single extraction electrode having an extraction aperture;

second power supply means for establishing a second potential difference between said extraction electrode and the same to provide an extraction field for directing secondary ions toward said means analyzer, said second power supply means maintaining said extraction electrode at an electrical potential which is more negative than the potential at which said analyzer means ion entrance aperture defining means is maintained and at a potential which is less negative than the potential applied to the sample, said second potential difference establishing means being adjustable independently of said first potential difference establishing means; and means for delivering secondary ions exiting said extraction field via said extraction aperture to said means analyzer via said entrance aperture defining means.

* * * * *

UNITED STATES PATENT AND TRADEMARK OFFICE

CERTIFICATE OF CORRECTION

PATENT NO. : 5,034,605

DATED : July 23, 1991

INVENTOR(S) : Alan R. Bayly

It is certified that error appears in the above-identified patent and that said Letters Patent is hereby corrected as shown below:

Column 9:

Claim 7, line 2, insert --a-- before "sample"; line 14, insert --said-- before "first"; line 14, insert --an-- before "amount"; line 24, insert --second-- before "electric".

Column 10:

Claim 14, line 16, change "charge" to --charged--; last line, after "potential" insert --, and is independent of said first and second potentials--.

Column 10:

Claim 17, line 4, change "$V_1-V_3)/V_1-V_2)$" to --$(V_1-V_3)/(V_1-V_2)$--.

Column 11:

Claim 21, line 4, insert --positively charged-- before "secondary"; line 11, change "applying" to --supplying--; line 13, change "negative" to --positive--; line 25, insert --mass-- before "analyzer"; line 26, delete "means" and insert in place thereof --ion entrance aperture--; line 28, change "negative" to --positive--; line 31, change "negative" to --positive--; line 38, change "analyzer means" to --mass analyzer--.

UNITED STATES PATENT AND TRADEMARK OFFICE
CERTIFICATE OF CORRECTION

PATENT NO. : 5,034,605

DATED : July 23, 1991

INVENTOR(S) : Alan R. Bayly

It is certified that error appears in the above-identified patent and that said Letters Patent is hereby corrected as shown below:

Column 12:

Claim 22, line 24, change "same" to --sample--; line 25, delete "means"; line 26, change "analyzer" to --mass analyzer ion entrance aperture--; line 38, change "means" to --mass--.

Signed and Sealed this

Twenty-third Day of November, 1993

Attest:

BRUCE LEHMAN

*Attesting Officer*

*Commissioner of Patents and Trademarks*